No. 873,019. PATENTED DEC. 10, 1907.
W. H. CLARKSON.
FRAME FOR SUPPORTING COAL DRILLS.
APPLICATION FILED DEC. 6, 1906.
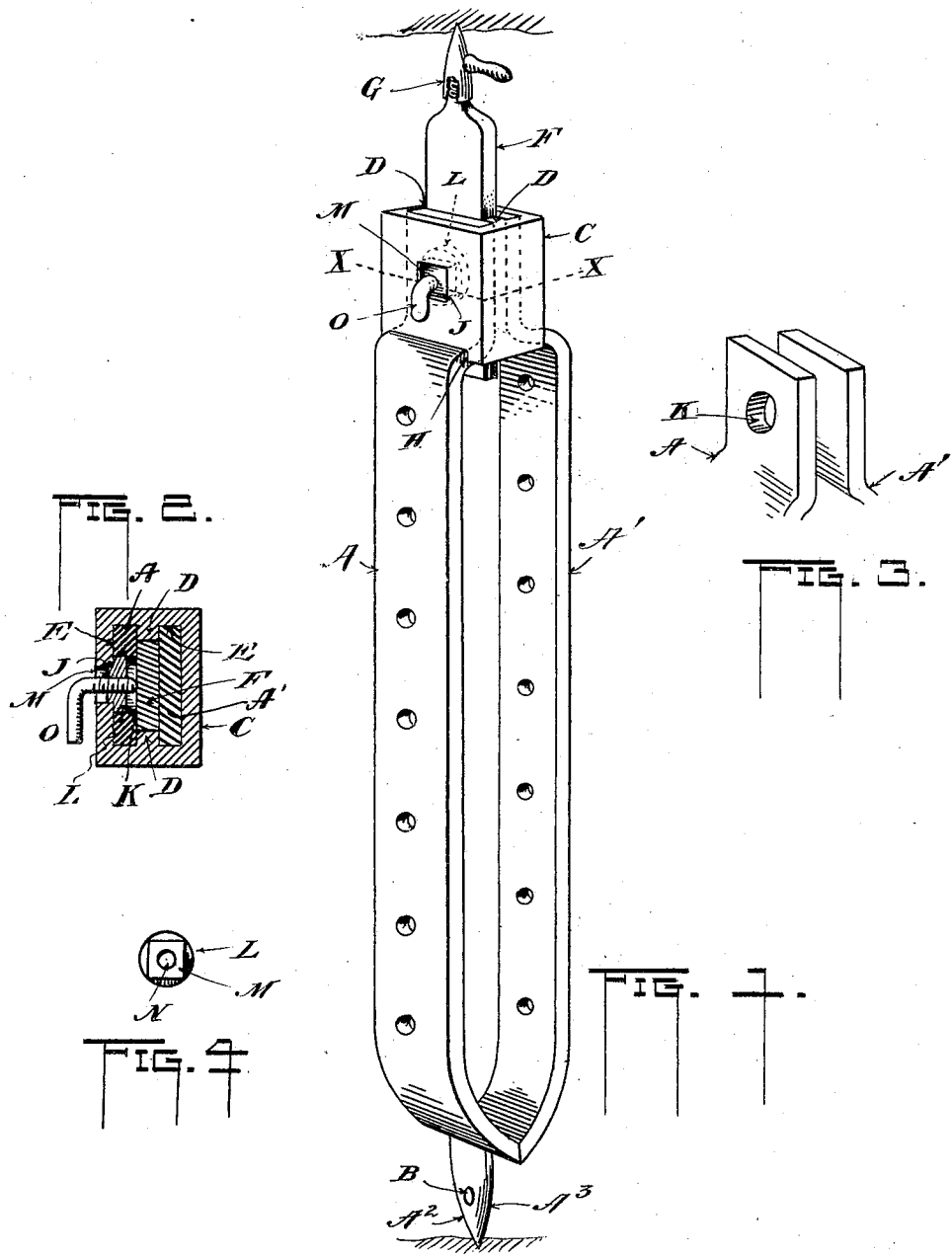
WITNESSES
INVENTOR
William H. Clarkson,
By L. M. Thurlow,
Atty.

UNITED STATES PATENT OFFICE.

WILLIAM H. CLARKSON, OF EDWARDS STATION, ILLINOIS.

FRAME FOR SUPPORTING COAL-DRILLS.

No. 873,019.     Specification of Letters Patent.     Patented Dec. 10, 1907.

Application filed December 6, 1906. Serial No. 346,580.

*To all whom it may concern:*

Be it known that I, WILLIAM H. CLARKSON, citizen of the United States, residing at Edwards Station, in the county of Peoria and State of Illinois, have invented certain new and useful Improvements in Frame for Supporting Coal-Drills; and I do hereby declare that the following is a full, clear, and exact description of the invention, which will enable others skilled in the art to which it appertains to make and use the same.

This invention pertains to improvements in frames for supporting coal drilling machines, relating more particularly to a frame having adjustable means for holding it firmly in a desired position.

An object of the invention is to provide an attachment for a coal-drill-frame by which a quick adjustment may be had.

It relates further to means for renewing portions of the device when worn without entailing great expense in so doing.

In the accompanying drawing, Figure 1 is an elevation in perspective of a coal-drill-frame having my improvement. Fig. 2 is a horizontal section of the same on line X X, Fig. 1. Fig. 3 is a perspective view of the upper extremities of the frame. Fig. 4 is a face view of a nut shown in Figs. 1 and 2.

A and A' indicate the vertical members of the frame, the lower ends of which are curved toward each other and provided with the pointed portions $A^2$ and $A^3$ secured by a rivet B or other suitable means whereby the said lower ends of the frame are firmly held together. The upper ends of the frame are shown in Fig. 3 these being bent toward each other and then extending parallel to each other to form the separated extensions shown.

C is a collar of rectangular form having therein on two of its opposite walls the vertical ribs D which leave between them the openings E each of which is slightly larger than the upper extensions of the frame which they receive. When the collar is positioned as shown in Fig. 1 there is inserted between the frame ends and fitting between the ribs D a vertically adjustable bar F having at its upper end a pointed internally threaded cap G said bar being slidable within the frame. The lower end of the collar is preferably notched at H to rest upon the shoulders of the frame though this is not important and need not be done unless desired, although it serves to assist in holding the collar in position. In one side of said collar is a square opening J and the upper extension of the frame adjacent thereto is provided with a hole K, Fig. 3, directly opposite and much larger than the hole J, as clearly shown in Fig. 2. At L is a disk adapted to enter the hole K of the frame extension which has fastened thereto or made integral therewith a square nut M adapted to snugly fit the square opening J in the collar.

The combined nut and disk is lowered to a position between the frame extension opposite the hole K described and into which it is pushed, the nut entering the square hole in the collar C. The bar F is then inserted between the said frame extensions to a position where the nut and disk will engage it. A hole N extends through the nut and disk and is threaded to receive a screw O of any desired form the inner end of which contacts with the bar F as shown. When the screw is turned in a direction to tighten it, its point will engage the said bar and the disk L will be forced against the inner surface of the collar resulting in holding the bar and the frame ends relatively rigid. By loosening the screw, the parts are free so that the bar may be raised or lowered and again tightened by the screw after a desired adjustment has been had. This sliding-bar permits for the rough adjustment while the cap G, described, provides for the final adjustment.

An advantage of my device is that when the threads of the screw O or those within the nut and disk L M become stripped these parts can be replaced in a minute or two at a cost of but a few cents, whereas in this class of devices as usually constructed the parts that are rendered useless can be replaced only at considerable expense since one of the main members must be renewed. In the present case by having the small renewable portion this expense is avoided.

Evidently the easiest way of inserting the nut and disk L M is to place it within the hole K in the extension of the frame portion A before the collar C is positioned after said collar is put in place said nut and disk may then be pushed toward and into the opening J collar after which the bar F can be inserted and the screw O entered.

I do not wish to be limited to the exact structure shown and described since equivalent means can be used.

Having thus described my invention, I claim:

1. A frame having independent opposed extremities, an adjustable bar between and separating them, a collar inclosing the bar and the frame extremities, a nut carried within one of the said extremities and held from turning therein, said nut adapted to bear outward upon the collar, and a screw carried by the nut and adapted to engage the adjustable bar.

2. A device of the class described comprising a frame having substantially parallel separated extremities, a collar for receiving such extremities, a slidable bar between the extremities, an internally screw threaded member carried in the collar and extending into one of the frame ends and having an enlargement within one of the ends of said frame for the purposes described, and a screw carried by the member, one end adapted to contact with the slidable bar, the said enlargement of said member adapted to bear outward against the inner surface of said collar.

3. A device of the character described comprising divided frame extremities, a bar positioned between the divided extremities and adapted to be clamped therebetween in any vertical adjustment, a member for inclosing the frame and bar, a screw for engaging the bar, and a nut for carrying the screw, said nut being seated in one of the frame extremities and prevented from turning, and adapted to bear outward against the member due to contact of its screw upon the said adjustable bar.

4. A device of the character described comprising a frame having independent substantially parallel extremities, a bar adjustable between said extremities, a collar carried by and inclosing the extremities, an internally threaded nut having an enlarged portion, there being an opening in the collar to receive the nut, there also being a larger opening in one of the frame extremities for receiving the enlarged portion of the nut, a screw carried by the nut and engaging the adjustable bar, the enlarged portion of the nut adapted to bear against the collar substantially as described.

5. A device of the character described, comprising a frame, its lower end engaging the coal, and having two upper substantially parallel extensions, a collar surrounding such extensions, a vertically slidable bar carried between the extensions within the collar there being a square opening within one side of the collar and a larger opening opposite said square opening within the adjacent frame extension, a member having a screw threaded aperture and seated partially in the smaller square opening and partially within the larger opening, that portion within the larger opening adapted to bear upon the inside surface of the collar as described, the said square opening preventing the member from turning, and a screw carried in and by the member and adapted to contact with the slidable bar and clamp the collar, the frame ends and the said bar firmly together.

6. A device of the character described comprising a frame, its lower end engaging the coal and having two upper substantially parallel extensions, a collar surrounding such extensions, a vertically slidable bar carried between the extensions within the collar there being a square opening in one side of the collar and a larger opening in the adjacent frame extension opposite said square opening, a member having a screw threaded aperture and seated partially in the smaller opening and partially within the larger opening that portion within the larger opening adapted to bear outwardly upon the inside surface of the collar as described, the said square opening preventing the member from turning, a screw carried in and by the member for contacting with the slidable bar and clamping the collar, the frame ends and the said bar firmly together, and a threaded member carried on the upper end of the sliding bar for the purposes set forth.

In testimony whereof I affix my signature, in presence of two witnesses.

WILLIAM H. CLARKSON.

Witnesses:
E. J. ABERSOL,
L. M. THURLOW.